(12) United States Patent
Schultz

(10) Patent No.: US 8,024,228 B1
(45) Date of Patent: Sep. 20, 2011

(54) CONCEALED PERFORMANCE BID

(76) Inventor: Patrick James Schultz, Apex, NC (US)

( * ) Notice: Subject to any disclaimer, the term of this patent is extended or adjusted under 35 U.S.C. 154(b) by 985 days.

(21) Appl. No.: 11/905,843

(22) Filed: Oct. 4, 2007

(51) Int. Cl.
*G06Q 30/00* (2006.01)
(52) U.S. Cl. .......................................... 705/26; 705/27
(58) Field of Classification Search .................. 705/26, 705/37, 27
See application file for complete search history.

(56) References Cited

U.S. PATENT DOCUMENTS

| | | | | |
|---|---|---|---|---|
| 6,415,270 | B1 * | 7/2002 | Rackson et al. | 705/36 R |
| 7,409,361 | B2 * | 8/2008 | Dinwoodie | 705/26.3 |
| 7,415,436 | B1 * | 8/2008 | Evelyn et al. | 705/37 |
| 7,428,501 | B2 * | 9/2008 | Dinwoodie | 705/26.3 |
| 7,792,713 | B1 * | 9/2010 | Kinney et al. | 705/35 |
| 2003/0158806 | A1 * | 8/2003 | Hanley et al. | 705/37 |
| 2004/0215467 | A1 * | 10/2004 | Coffman et al. | 705/1 |
| 2005/0165650 | A1 * | 7/2005 | Kothapalli et al. | 705/26 |
| 2006/0136325 | A1 * | 6/2006 | Barry et al. | 705/37 |
| 2007/0124232 | A1 * | 5/2007 | Brett | 705/37 |
| 2007/0130059 | A1 * | 6/2007 | Lee et al. | 705/37 |
| 2007/0174179 | A1 * | 7/2007 | Avery | 705/37 |
| 2008/0313089 | A1 * | 12/2008 | Du Preez | 705/80 |

OTHER PUBLICATIONS

Yeniyurt et al., "To bid or not to bid: drivers of bidding behavior in electronic reverse auctions", Yeniyurt, Sengun; Watson, Stevie; Carter, Craig R.; Stevens, Cynthia Kay, Journal of Supply Chain Management , 47 , 1 , 60(13), Jan. 2011, downloaded from DialogWeb on the Internet on May 21, 2011, 21 pages.*
Kaufmann et al, Deciding on the Mode of Negotiation: To Auction or Not to Auction Electronically, Lutz Kaufmann, Craig R Carter. Journal of Supply Chain Management. Tempe: Spring 2004. vol. 40, Iss. 2; p. 15, downloaded from ProQuestDirect on the Internet on May 21, 2011, 24 pages.*
Deck, Cary A; Wilson, Bart J, Auction Markets for Evaluations, Southern Economic Journal v72n1 pp. 42-62, Jul. 2005, 22 pages, downloaded from DialogWeb on Jun. 16, 2011.*
Supply chain management: Rx software that kills the pain, Purchasing , v 131 , n 15 , p. SCOV1(10), Sep. 19, 2002, 17 pages, downloaded from DialogWeb on Jun. 16, 2011.*
Swallow, Stephen K.; Opaluch, James J.; Weaver, Thomas F., "Siting noxious facilities: an approach that integrates technical, economic, and political considerations", Land Economics , v68 , n3 , p. 283(19), Aug. 1992, 20 pages, downloaded from DialogWeb on Jun. 16, 2011.*
Rozek, Richard P., Competitive bidding in electricity markets: a survey, Energy Journal , v10 , n4 , p. 117(22), Oct. 1989, 15 pages, downloaded from DialogWeb on Jun. 16, 2011.*

* cited by examiner

*Primary Examiner* — James Zurita

(57) ABSTRACT

System(s) and method(s) for offering one or more items, for sale or for purchase, for a specified period of time during which participants bid to purchase or sell the items. The system provides each participant an indication of how their bid compares to bids placed by others. The system does not disclose the bid details of other participants. By providing this bid range of information, each bidder has a sense of their general bid position (not knowing others specific bids), compared to all bidders and by this means, the overall price offered for the item may be driven up or, in the case of offer to buy bid, driven down.

1 Claim, No Drawings

CONCEALED PERFORMANCE BID

FIELD OF INVENTION

The invention relates to a process whereby, an item or items may be sold and or an item or items may be offered ("Bid") to purchase within a defined period of time and whereby, each actual Bid to buy or offer to sell value is concealed but, each potential buyer or seller is provided information telling them that the value they are bidding is within the overall bid range, when compared to all persons bidding for the item being sold.

BACKGROUND OF THE INVENTION

Since almost the beginning of man, people have been exchanging, bartering, selling and buying to and from each other. There have been many means developed over time for the exchange of value between two or more parties. In most exchanges, there is a set or negotiated value for goods or services whereby, the exchanging parties give and take something between themselves.

The exchange processes of today are much different from those of just 10 years ago. This is due to the flattening of our commerce world and because there are many new technologies that provide us new means to exchange value. Because there are so many more kinds of things of value to today's man, complex exchange processes have evolved that support today's commerce needs.

As in the past and for today, auctions play an important role in our day-to-day exchange of goods and services. Auctioning has been with us for many years however, the auction process has evolved slightly to support e-commerce activities, much like that used on e-bay and other internet auction sites. Today, many companies still conduct traditional auctions for the sale of animals, cars, houses, land and other things. In such auctions, one may purchase or sell something to others through an open and closed bidding process. In an open bidding process, everyone knows what everyone else is offering for an item. In a closed bidding process, no one knows what the other bidders are offering for an item until after the auctions time is closed and all bidder offers are then opened for inspection and validation. Examples of this are; 1.) Cattle auctions, 2.) E-Bay live auctions, 3.) On-line and traditional Sealed Bid Auctions, 4.) Fund Raiser "blind auctions', and open auctions, much like the famous Christie's Auction.

Today, no one has invented a process for selling and buying something whereby, buyers and sellers bids to acquire something is concealed and at the same time, there is a means to provide to a bidder, an indication of how their bid compares other bids. By providing a individual bid performance means for concealed, sealed or closed auction type sales (offers to sell or to purchase) bidders will better understand how their bid stacks up against others, without disclosing actual bid prices. By providing these indications, I have created a new process and dimension to auction process that will have profound affects on such commerce. In essence this process keeps bidders out of the dark, providing just enough information to them to ramp up auction item values. For this reason, I have invented the Concealed Performance Bid.

SUMMARY OF THE INVENTION

This invention provides participants of auction type buying and selling just enough information to know if their most recent bid is competitive with others in the auction field. At the same time, bidders are not being provided other bidders bid details, and with that, there is an increased probability of increased bidder activity, which may draw a higher price for something being sold or, may draw a lower price for something being offered to purchase. This invention, also when used during a best and final type auction, preserves the best and final process.

DETAILED DESCRIPTION AND SPECIFICATION OF THE INVENTION

The following examples are provided as a means to explain the importance and benefits of the invention and should not be considered to be all encompassing nor limited to such descriptivism:

1. The Concealed Performance Bid process selling something is as follows;
    a. Something is going to be sold to one or more parties using a concealed or sealed bidding process; a process whereby, the parties wishing to purchase something from the seller and do so by providing the seller of said something, an offer to purchase, within a designated time that the something is being sold, i.e., "For sale, a gas station located at 124 main street, somewhere city, USA being offered for sale under a sealed bid process, whereby final offers must be delivered to the seller prior to midnight, Aug. 17, 2008".
    b. Bidders submit to the seller, an offer, or offers, to purchase the sellers something in written form, including but not limited to hand written matter, electronic media, electronic web based media, and other provable means. All offers are collected and information assembled by the seller and then compared to determine the competitive position of each bidder within the overall range of bidder offers, from the lowest to highest. Example: 300 bids are properly submitted at any given time within the allowed sale timeframe. the Lowest bid for something being sold, is $1,000. and the highest bid is $10,000. A bid submitted at $5,000.00 would be ranked with a 50% performance level, or mid rang. Based on the concealed performance bid parameters, the seller could provide this bidder many indicators that provide this bidder an idea of how there bid ranks, or is performing against all other bidders at that time. This may be expressed in many ways and as an example: "Average Bid", "X-Y % range bid", "You are in the running, but need to increase your bid to win".
2. The Concealed Performance Bid process for offering to purchase something is as follows:
    a. Something is going to be offered to purchase to more than one party using a concealed or sealed bidding process; a process whereby, the parties wishing to sell something to the buyer and do so by providing the buyer of said something, an offer to sell within a designated time that the something is being offered to purchase, i.e., Offer to Purchase, speed torque wrench meeting buyers specification #29887-7, subject to published payment terms and conditions, this offer to Purchase under a sealed bid process and whereby, final offers must be delivered to the buyer prior to midnight, Sep. 3, 2008.
    b. Bidders submit to the buyer, an offer, or offers, to sell the to the buyers something in written form, including but not limited to hand written matter, electronic media, electronic web based media and other provable means. All offers are collected and information assembled by the buyer and then compared to determine the competitive position of each bidder within the overall range of bidder offers, from the lowest to the highest. Example: 500 bids are properly submitted at any given time within the allowed offer to purchase timeframe. The lowest bid for something to be purchased is $5,000.00 and the highest bid for something to be purchased is 10,000.00. A bid submitted at $5,500.00 would be ranked within a 90% performance level, based on the concealed performance bid parameters, the buyer could provide to this bidder many indicators that provide the bidder an idea of how this bid ranks or, is performing against all other bidders at the same time. This may be expressed in may ways and as an example: "Top Bid Range", "X-Y % range bid", "You are in the top tier of bidders at this time, consider doing a bit better".

I claim:

1. An internet based auction method for processing sealed bids, comprising:

tendering, by a server computer, at least one offering for auction at a web site for a predetermined period of time;

placing, by a bidder at a client computer, at least one sealed bid for the offering;

comparing, by the auction site, said sealed bid to all sealed bids, said comparing based at least in part on bid parameters including price;

providing an indication, by the auction site, to the bidder at the client computer, of a relative ranking of the user's sealed bid compared to sealed bids from other bidders, wherein said comparison is based at least in part on the bid parameters of the sealed bids for the at least one offering;

displaying said indication at the client computer, wherein the indication is presented to the bidder in one or more formats, each format based at least in part on an upper and a lower threshold ranking criteria for each indication;

reiteratively updating said indication based on subsequent sealed bids for the offering.

* * * * *